March 7, 1944.        H. L. HARTZELL        2,343,455
IGNITION DISTRIBUTOR
Filed Sept. 7, 1942
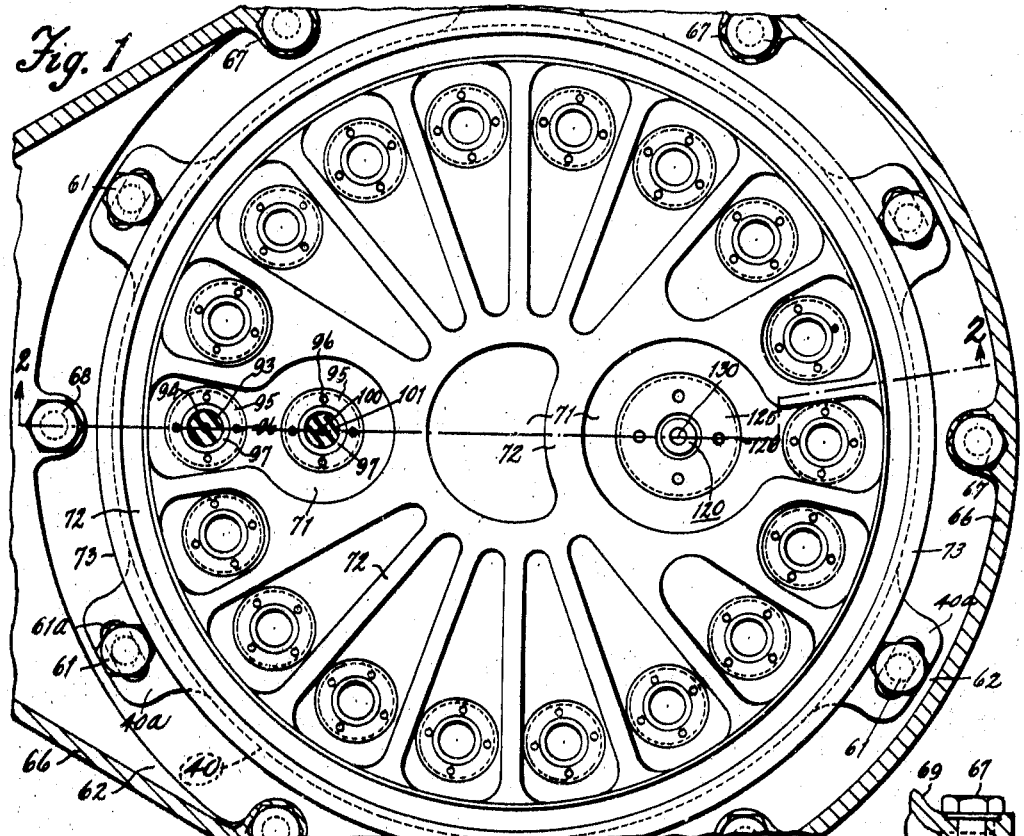
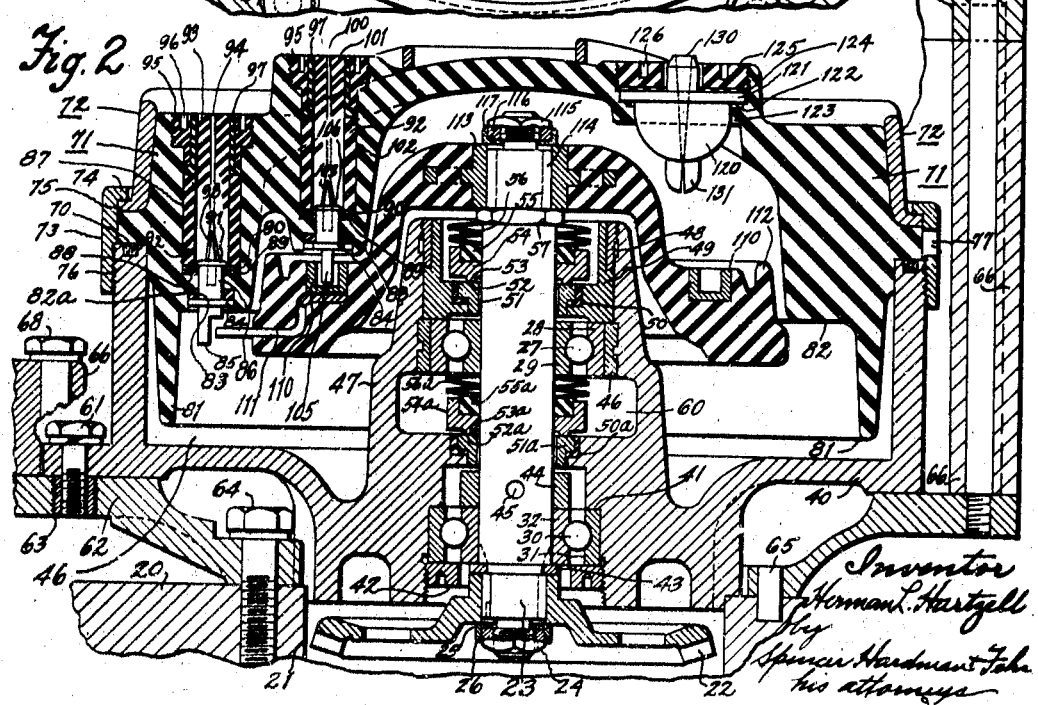

Patented Mar. 7, 1944

2,343,455

UNITED STATES PATENT OFFICE 2,343,455

IGNITION DISTRIBUTOR

Herman L. Hartzell, Anderson, Ind., assignor to General Motors Corporation, Detroit, Mich., a corporation of Delaware Application September 7, 1942, Serial No. 457,605

5 Claims. (Cl. 200—19)

This invention relates to an ignition distributor for aviation use and its aim is to provide a sealed distributor for containing air or other gaseous medium under pressure whereby the distributor will give satisfactory operation at high altitude.

Further objects and advantages of the present invention will be apparent from the following description, reference being had to the accompanying drawing wherein a preferred embodiment of the present invention is clearly shown.

In the drawing:

Fig. 1 is a plan view of a distributor constructed in accordance with the present invention.

Fig. 2 is a sectional view on the line 2—2 of Fig. 1.

Referring to the drawing, 20 designates a frame of the engine providing an opening at 21 which receives a gear 22 driven by the engine and connected to a shaft 23 by a nut 24 engaging the screw threaded end of the shaft and locked by a washer 25 having tangs bent along the flat sides of the nut 24. The shaft 23 is supported by ball bearings 27 and 30 having respectively outer races 28 and 31 and inner races 29 and 32. The housing 40 which supports these bearings is an aluminum casting providing an annular shoulder 41 against which the outer race 31 of bearings 30 is secured by an annular threaded bushing 42. Spacing washer 43 is located between gear 22 and the inner race 32 which bears against a collar 44 secured to shaft 23 a pin 45. The outer race 28 of bearing 27 is received by a hard metal insert 46 in the central tubular portion 47 of the housing 40. A tubular bushing 48 threadedly connected with the upper end of the part 47 confines a sleeve 49 against the bearing outer race 28 and insert 46. Sleeve 49 provides a recess for receiving a rubber seal 50 which receives a bushing 51 which clears the shaft 23 and which provides a ground surface 52 receiving the ground surface provided by an annular boss 53 of a seal ring 54 providing a pocket for receiving a soft rubber washer 55 against which pressure is exerted by four dished spring washers 56 confined between washer 55 and a shoulder 57 of shaft 23. The resilient discs 57 urge the seal boss 53 against the seal ring 51 and thus substantially retard escape of air or gas under pressure within the housing 40 downwardly along the shaft 23. Some of this pressure fluid may escape and will pass downwardly through the bearing 27 into a chamber 60 from which escape is substantially prevented by another set of sealing parts 51a through 56a which are a counterpart of those numbered 51 through 56.

Housing 40 is attached by screws 61 to a lightweight metal plate 62 having steel inserts 63 engaging the threads of the screws 61. Plate 62 is attached by screws 64 to frame 20 and is located relative thereto by a dowel pin 65. Plate 62 provides a support for the side wall portion 66 of a metal shield secured thereto by screws 67 and 68. The shield side wall portion 66 extends from the plate 62 above the top of the distributor and receives a shield cover 69 secured by the screws 67 to the side wall portion 66.

The housing 40 carries a rubber sealing ring 70 which receives a nonconducting distributor cap or head 71 which is reinforced by a metal spider 72 which together with the head 71 is secured to the housing 40 by a ring 73 having internal flange 74 engaging an external flange 75 of the spider 72 and having screw threads 76 engaging screw threads of the housing 40. The nut 73 can be turned by a spanner wrench engaging holes 77 in the nut.

Distributor head 71 has a skirt 81 extending below a surface 82. Above the surface 82, the head 71 provides a circular row of hexagonal pockets 82a each of which receives a rubber sealing washer 83 and the hex flange 84 of a distributor post or terminal 85, the shank of which extends into a cable receiving recess 87. The bottom surface 88 of the recess 87 receives a plane washer 89 and a cupped spring washer 90. When the upper end of shank 86 is riveted over at 91 against the washer 90 the rubber ring 83 is compressed and squeezed against the recess 82a and against the shank 86 so as to prevent the escape of pressure fluid in the housing 46 around the shank 86 of the terminal 85.

In order to seal each cable end and thus to prevent an arc from the cable end to the grounded cage 72, each socket 87 receives a rubber seal bushing 92 which can be forced around the insulation 93 of a wire 94 by screwing down a nonconducting nut 95 having spanner wrench recesses or holes 96. The screwing down of nut 95 forces a nonconducting bushing 97 against the top end of seal bushing 92 and forces the same against the wire of socket 87 and against the insulation 93 of wire 94. Thus the cable end is effectively sealed and the wire 94 of the cable is held in position with its strands engaging a metal pin 98 extending from the post 85.

The number of sockets 87 equals the number of spark plugs of the engine. The sparking impulses are furnished by an ignition coil (not shown) whose secondary terminal is connected with a wire 100 having insulation 101 and received by a socket 102 which, like socket 87, contains a seal bushing 92 urged downwardly by a nut 95 which forces a bushing 97 against the upper end of a seal bushing 92. The strands of wire 100 are engaged by a pin 103 extending from the shank 104 of a terminal 105 which, like the terminal 85, has a hex flange 84 bearing against a seal ring 83 which is compressed when the upper end of terminal 105 is riveted as at 106 down against a spring washer 90 which bears against a plane washer 89. The terminal 105 projects into a groove of a metal ring 110 which is soldered to a distributor segment 111 which together with the segment are imbedded in a nonconducting distributor rotor block 112 having a metal insert 113 providing a hub which is splined at 114 to the upper end of shaft 23 and which is clamped against the shoulder 57 of shaft 23 by screwing down a nut 115 engaging the upper threaded end of the shaft 23 and held in position by washer 116 having tangs 117 which can be bent against the flats of nut 115.

Head 71 provides a pocket for receiving a soft rubber self-closing valve 120 having a flange 121 provided with a bead 122 received by a groove in the upper surface of the internal flange 123 which closely fits around the valve 120. A nonconducting washer 124 rests upon the flange 121 and is engaged by a nonconducting nut 125 having spanner wrench holes 126 for turning it. The screwing down of the nut 125 forces the washer 124 down against the flange 121 and against the flange 123 thus sealing the valve 120 to the distributor head 71. The valve 120 provides a needle-passage 130 for receiving a needle nozzle of a compression pump by which air and other gas can be forced under pressure into the chamber provided by the housing 40 and the head 71. When the nozzle is removed the lips 131 close together and prevent escape of pressure fluid out through the valve.

Since the head 71 is subjected to internal pressure which is considerably above atmospheric pressure at high altitude and since the head 71 may be subjected to heat of the engine, there is a tendency of the head to become distorted. Such distortion would be apt to open one or more of the seals; but such distortion is substantially prevented by the metal reinforcing spider 72.

From the foregoing description it is apparent that the distributor housing is gas-tight for all practical purposes. It will retain gas under pressure for a substantial period and thus prevent the grounding of ignition currents, although the voltage required for producing a spark at a spark plug is high enough to cause an arc of several inches in the surrounding atmosphere at high altitudes.

While the embodiment of the present invention as herein disclosed, constitutes a preferred form, it is to be understood that other forms might be adopted, all coming within the scope of the claims which follow.

What is claimed is as follows:

1. A gas-tight ignition distributor for use at high as well as low altitude comprising a housing, a nonconducting distributor cover attached to the housing and providing therewith a chamber for receiving gas under pressure, means for admitting gas under pressure to the chamber, means for sealing the joint between the cover and housing, a shaft rotatably supported by the housing and extending into the chamber, a rotor within the chamber driven by the shaft, a shaft seal for preventing the escape of gas from the chamber along the shaft, a conducting segment carried by the rotor, distributor posts carried by the cover and extending therethrough and receiving sparking impulses distributed by the rotor segment, a terminal carried by the cover and extending therethrough for making an electrical connection with a source of sparking impulses and with the rotor segment, cable receiving sockets provided by the cover and respectively enclosing the posts and terminal, insulated cables received by the sockets having their conducting portions respectively in engagement with the posts and terminal, sealing means respectively between the posts and terminal and the cover, and sealing means respectively between the walls of the cable receiving sockets and the insulation of the cables.

2. An ignition distributor according to claim 1 in which distributor posts and terminal are each of rivet-like formation, the head of which is located within the chamber, there being a sealing gasket surrounding the shank of the rivet and between the rivet head and an inner wall of the cover, the rivet shank extending beyond an outer wall of the cover and through a cupped resilient metal washer and deformed against said washer.

3. An ignition distributor according to claim 1 in which the insulation of the cable received by a socket is surrounded by a soft rubber sleeve and which means screw-threadedly attached to the cover engage the sleeve to maintain it under longitudinal compression to force it against the interior wall of the socket and to constrict it around the cable insulation in order to provide a seal and to resist longitudinal movement of the cable within the socket whereby the conducting portion of the cable is maintained in engagement with the post or terminal within the socket.

4. An ignition distributor according to claim 1 having also a metal spider for resisting distortion of the cover due to pressure in the chamber, and means securing the spider upon the cover and the cover upon the housing.

5. A gas-tight ignition distributor for use at high as well as low altitudes and comprising detachable members providing a chamber for receiving gas under pressure, a shaft extending through one of the members, conductors extending through the other members, a distributor rotor driven by the shaft and having a segment for distributing sparking impulses from a conductor to other conductors in recurrent sequence, means for admitting gas under pressure to the chamber, and devices for preventing escape of gas from the chamber around the shaft, around the conductors and at the joint between the chamber members.

HERMAN L. HARTZELL.